United States Patent
Amitay et al.

(10) Patent No.: US 9,530,387 B2
(45) Date of Patent: Dec. 27, 2016

(54) ADJUSTING DIRECT MEMORY ACCESS TRANSFERS USED IN VIDEO DECODING

(75) Inventors: Amichay Amitay, Hod'ha Sharon (IL); Alexander Rabinovitch, Kfar Yona (IL); Leonid Dubrovin, Karney Shomron (IL)

(73) Assignee: Intel Corporation, Santa Clara, CA (US)

( * ) Notice: Subject to any disclaimer, the term of this patent is extended or adjusted under 35 U.S.C. 154(b) by 734 days.

(21) Appl. No.: 13/456,484

(22) Filed: Apr. 26, 2012

(65) Prior Publication Data

US 2013/0286029 A1 Oct. 31, 2013

(51) Int. Cl.
*G09G 5/399* (2006.01)

(52) U.S. Cl.
CPC ...... *G09G 5/399* (2013.01); *G09G 2320/0261* (2013.01); *G09G 2360/127* (2013.01); *G09G 2360/18* (2013.01); *G09G 2370/12* (2013.01)

(58) Field of Classification Search
CPC .................................................. H04N 19/423
USPC ...................... 345/501, 519, 502, 55; 712/34
See application file for complete search history.

(56) References Cited

U.S. PATENT DOCUMENTS

| | | | |
|---|---|---|---|
| 5,115,411 A * | 5/1992 | Kass et al. ........... | G06F 13/4018 365/189.02 |
| 5,900,865 A * | 5/1999 | Howe ........................... | 345/572 |
| 6,028,612 A | 2/2000 | Balakrishnan et al. ...... | 345/517 |
| 6,996,178 B1 | 2/2006 | Zhang et al. ............ | 375/240.16 |
| 2001/0047456 A1* | 11/2001 | Schrobenhauzer et al. .. | 711/122 |
| 2005/0169378 A1 | 8/2005 | Kim et al. ............... | 375/240.16 |
| 2005/0226332 A1* | 10/2005 | Uetani ................... | H04N 19/51 375/240.16 |
| 2005/0262276 A1* | 11/2005 | Singh et al. ............ | G06F 13/28 710/22 |
| 2007/0176938 A1 | 8/2007 | Nagori ......................... | 345/543 |
| 2011/0110428 A1* | 5/2011 | Chang et al. .... | H04N 19/00684 375/240.16 |

* cited by examiner

*Primary Examiner* — Kee M Tung
*Assistant Examiner* — Whitney Pointe
(74) *Attorney, Agent, or Firm* — Green, Howard & Mughal, LLP (57) ABSTRACT

An apparatus having a first memory and a circuit is disclosed. The first memory may be configured to store a list having a plurality of read requests. The read requests generally (i) correspond to a plurality of blocks of a reference picture and (ii) are used to decode a current picture in a bitstream carrying video. The circuit may be configured to (i) rearrange the read requests in the list based on at least one of (a) a size of a buffer in a second memory and (b) a width of a data bus of the second memory and (ii) copy a portion of the reference picture from the second memory to a third memory using one or more direct memory access transfers in response to the list.

20 Claims, 5 Drawing Sheets

ADJUSTING DIRECT MEMORY ACCESS TRANSFERS USED IN VIDEO DECODING

CROSS REFERENCE TO RELATED APPLICATIONS

The present application is related to co-pending U.S. application Ser. No. 12/914,070, filed Oct. 28, 2010, which is hereby incorporated by reference.

FIELD OF THE INVENTION

The present invention relates to video decoding generally and, more particularly, to a method and apparatus for adjusting direct memory excess transfers used in decoding video.

BACKGROUND OF THE INVENTION

Applications of video encoding typically use a motion estimation and compensation mechanism. The motion estimation and compensation mechanism aids in compressing the video since each frame can be based on frames previously encoded. A decoder can reproduce the frame by copying each block from a reference frame according to one or a few motion vectors. Different blocks of the encoded frame can be encoded using the same data in the reference frame, so the data is largely reused. The reference frames are typically buffered in a double data rate (i.e., DDR) memory because of the large amount of information involved, especially in high-definition video. The large amount of data is commonly subject to inefficient read operations.

Current video decoding methods use a data cache to buffer some of the data stored in the DDR memory. The cached data supports reuse in the decoding process. However, cache mechanisms are expensive in terms of both silicon area and power. To support video decoding applications, a size of the cache is large. In addition, the timing control of large data caches is difficult.

Another common method used in video decoding involves direct memory access (i.e., DMA) reads from the DDR memory. The DMA reads have a disadvantage in that reuse of areas that were previously read are not supported. As such, the same data is fetched several times, which is expensive in terms of the data bus to and from the DDR memory since the amount of data is high.

It would be desirable to implement a system and method for adjusting direct memory access transfers used in decoding video.

SUMMARY OF THE INVENTION

The present invention concerns an apparatus having a first memory and a circuit. The first memory may be configured to store a list having a plurality of read requests. The read requests generally (i) correspond to a plurality of blocks of a reference picture and (ii) are used to decode a current picture in a bitstream carrying video. The circuit may be configured to (i) rearrange the read requests in the list based on at least one of (a) a size of a buffer in a second memory and (b) a width of a data bus of the second memory and (ii) copy a portion of the reference picture from the second memory to a third memory using one or more direct memory access transfers in response to the list.

The objects, features and advantages of the present invention include providing a method and/or apparatus for adjusting direct memory access transfers used in decoding video that may (i) include a DMA mechanism that receives a list of memory read operations based on motion vectors, (ii) identify overlaps in the list, (iii) rearrange read accesses in the list to make efficient use of an external memory, (iv) reduce reads from the external memory, (v) reduce a bus bandwidth utilization of the external memory, (vi) reduce overall power consumption, (vii) include a multi-destination DMA transfer mechanism to distribute data from overlapping accesses to different locations in an internal memory and/or (viii) support decoding of compressed and encoded digital video.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may use an improved direct memory access (e.g., DMA) mechanism that identifies overlaps within a list of DMA read transactions and improves data bus utilization. The result generally reduces a number of reads from an external memory, a bus bandwidth utilization and a power consumption.

The DMA mechanism is generally suitable for inter-prediction and/or bidirectional prediction decoding of compressed and encoded digital video and similar applications. In the video decoding applications, a motion compensation (e.g., MC) generally involves copying regions from previously-decoded reference pictures (e.g., frames, fields or images) as predictors for blocks in a current picture being decoded. A video encoder may transmit the motion vectors and residual data for the inter-predicted and bidirectionally predicted blocks. The motion vectors generally indicate which regions of the reference pictures may be copied for the motion compensation operation applied to each of the inter-predicted/bidirectionally predicted blocks of the current picture. Besides blocks, regions (e.g., macroblocks, slices or entire pictures) may be processed with the motion compensation operation to enable more efficient operation of loops within the motion compensation operation (e.g., same mechanisms may be applied to all blocks and so may not be initialized for each block separately).

Figure 1:
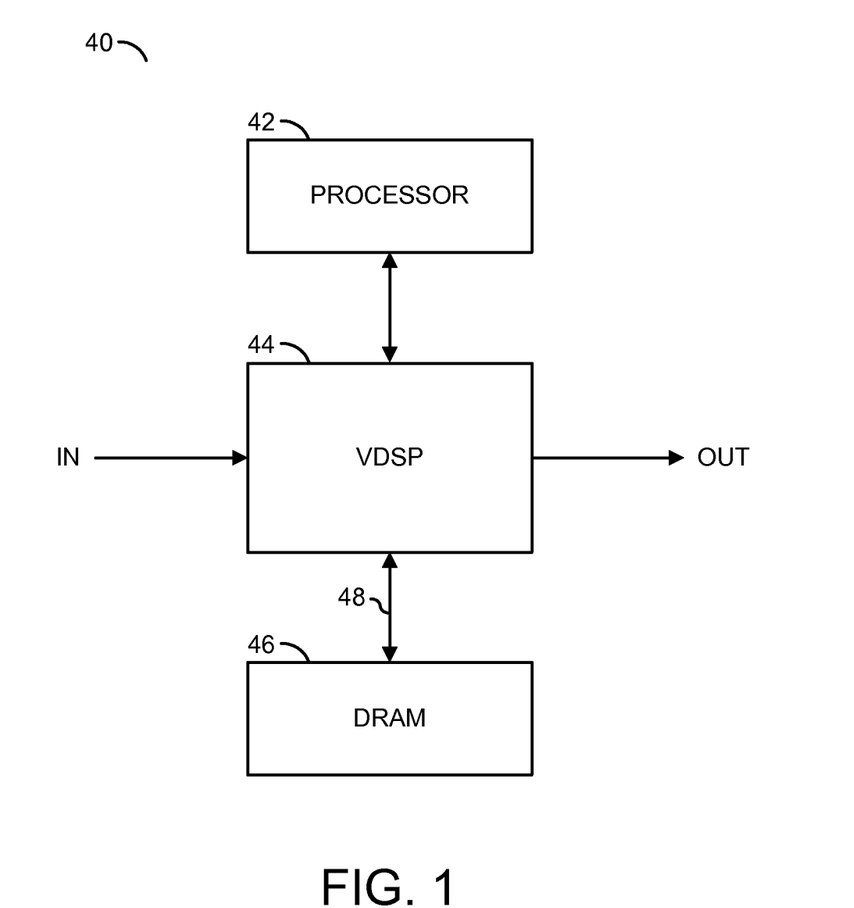
FIG. 1 is a block diagram of an example implementation of an apparatus.

Referring to FIG. 1, a block diagram of an example implementation of an apparatus 40 is shown. The apparatus (or circuit or device or integrated circuit) 40 may implement a video decoder. The apparatus 40 generally comprises a block (or circuit) 42, a block (or circuit) 44, a block (or circuit) 46 and a bus (or circuit) 48. The circuits 42-48 may represent modules and/or blocks that may be implemented as hardware, software, a combination of hardware and software, or other implementations.

The circuit 44 may be directly coupled with the circuit 42 to exchange data and control information. The circuit 44 may be coupled with the circuit 46 to exchange data. An input bitstream signal (e.g., IN) may be received by the circuit 44. An output signal (e.g., OUT) may be presented by the circuit 44.

The signal IN may be a compressed and encoded digital video signal, generally referred to as a bitstream. The signal IN may comprise a sequence of progressive-format frames and/or interlace-format fields. The signal IN may be compliant with a VC-1, MPEG and/or H.26x standard. The MPEG/H.26x standards generally include H.261, H.264, H.263, MPEG-1, MPEG-2, MPEG-4 and H.264/AVC. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The signal OUT may be one or more analog video signals and/or one or more digital video signals. The signal OUT generally comprises a sequence of progressive-format frames and/or interlace-format fields. The signal OUT may include synchronization signals suitable for synchronizing a display with the video information. The signal OUT may be presented in analog form as, but is not limited to, an RGB (Red, Green, Blue) signal, an EIA-770 (e.g., YCrCb) signal, an S-video signal and/or a Composite Video Baseband Signal (CVBS). In digital form, the signal OUT may be presented as, but is not limited to, a High Definition Multimedia Interface (HDMI) signal, a Digital Video Interface (DVI) signal and/or a BT.656 signal. The signal OUT may be formatted as a standard definition signal or a high definition signal.

The circuit 42 may be implemented as a processor. The circuit 42 may be operational to perform select digital video decoding operations. The decoding may be compatible with the VC-1, MPEG or H.26x standards. The circuit 42 may also be operational to control the circuit 44. In some embodiments, the circuit 42 may implement a SPARC processor. Other types of processors may be implemented to meet the criteria of a particular application. The circuit 42 may be fabricated as an integrated circuit on a single chip (or die).

The circuit 44 may be implemented as a video digital signal processor (e.g., VDSP) circuit. The circuit 44 may be operational to perform additional digital video decoding operations. The circuit 44 may be controlled by the circuit 42. Decoding operations performed by the circuit 44 may include, but are not limited to the following. Multiple motion vectors may be parsed from the bitstream in the signal IN. A list may be generated by converting the motion vectors into read requests. The list is generally stored in a local memory. The read requests in the list may be rearranged (or modified) based on at least one of (i) a size of a read buffer in the circuit 46 and (ii) a width of the bus 48. A portion of a reference picture may be copied from the circuit 46 to an internal memory within the circuit 44 using one or more direct memory access transfers in response to the list. Multiple blocks within the portion of the reference picture in the internal memory of the circuit 44 may be motion compensated based on the motion vectors. In some embodiments, the circuit 44 may implement one or more digital signal processors. The circuit 44 may be fabricated as an integrated circuit on a single chip (or die). In some embodiments, the circuits 42 and 44 may be fabricated on separate chips.

The circuit 46 may be implemented as a dynamic random access memory (e.g., DRAM). The circuit 46 may be operational to store or buffer large amounts of information consumed and generated by the decoding operations and the filtering operations of the apparatus 40. As such, the circuit 46 may be referred to as a main (or external) memory. The circuit 46 may be implemented as a double data rate (e.g., DDR) memory. Other memory technologies may be implemented to meet the criteria of a particular application. The circuit 46 may be fabricated as an integrated circuit on a single chip (or die). In some embodiments, the circuits 42, 44 and 46 may be fabricated on separate chips.

The circuit 48 may implement a memory bus. The bus 48 is generally operational to carry data, address and commands between the circuit 44 and the circuit 46. The bus 48 generally includes a data bus having a width (e.g., W) of multiple bits (e.g., 128 bits).

Figure 2:
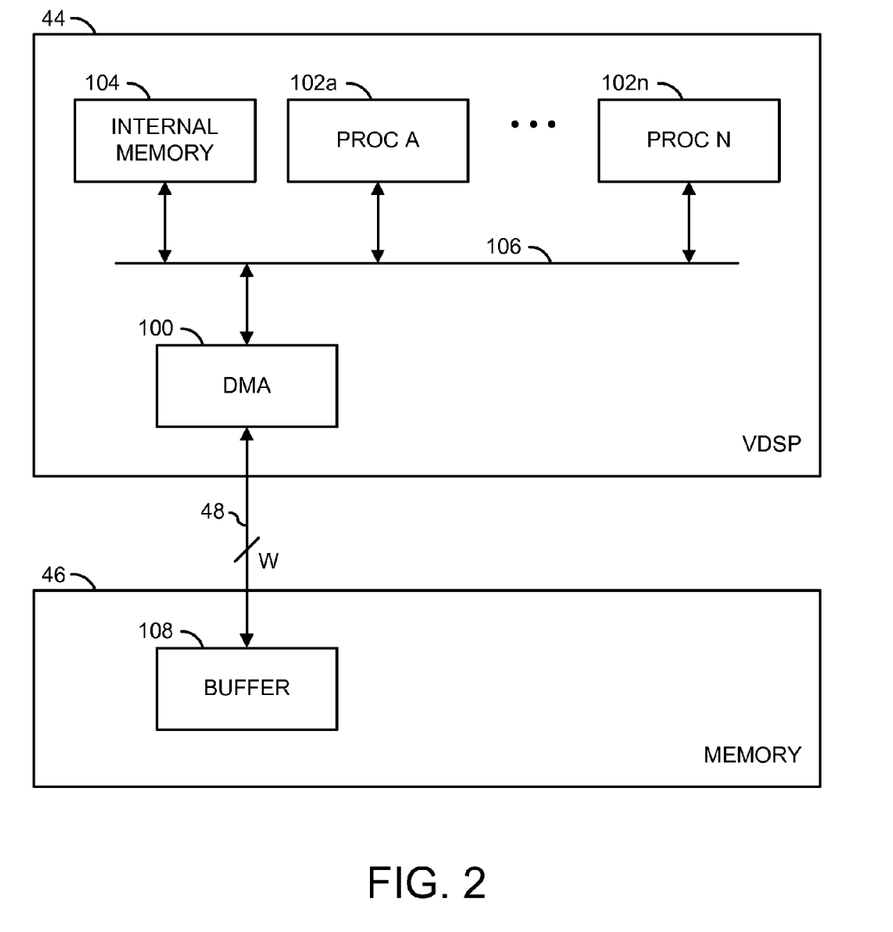
FIG. 2 is a detailed block diagram of the apparatus in accordance with a preferred embodiment of the present invention.

Referring to FIG. 2, a detailed block diagram of the apparatus 40 in accordance with a preferred embodiment of the present invention is shown. The circuit 44 generally comprises a block (or circuit) 100, one or more blocks (or circuits) 102a-102n, a block (or circuit) 104, and a bus (or circuit) 106. The circuit 46 generally comprises a block (or circuit) 108. The circuits 100-108 may represent modules and/or blocks that may be implemented as hardware, software, a combination of hardware and software, or other implementations.

The circuit 100 may be bidirectionally coupled to the circuit 108 via the bus 48. The circuits 102a-102n may be bidirectionally coupled to the circuit 100 via the bus 106. The circuit 104 may be bidirectionally coupled to the circuits 100 and 102a-102n via the bus 106.

The circuit 100 may implement a direct memory access circuit. The circuit 100 is generally operational to store the list received from the circuits 102a-102n in the local memory. The circuit 100 may also be operational to rearrange the read requests in the list based on at least one of (i) a size of the circuit 108 and (ii) a width of the bus 48. The circuit 100 may be further operational to copy a portion of a reference picture from the circuit 46 to the circuit 104 using one or more direct memory access transfers in response to the list.

Each circuit 102a-102n may implement a core processor circuit. The circuits 102a-102n are generally operational to execute a plurality of program instructions (e.g., software programs). The programs may include, but are not limited to, an entropy decoding process, a rearranging process, a parsing process, an inverse quantization process, an inverse transform process, a motion compensation process, an addition process, a block filtering process and generate the list from the parsed motion vectors.

The circuit 104 may implement an internal memory circuit. The circuit 104 may be operational to store reference samples and the current block samples used in the motion compensations. The circuit 104 may be utilized by the circuits 102a-102n as a local storage for rapid access to the reference samples and the current block samples.

The circuit 106 may implement an internal bus. The bus 106 may be operational to transfer data, samples, commands and other information between the circuits 100, 102a-102n and 104.

The circuit 108 may implement a read buffer circuit. The circuit 108 is generally operational to buffer data being read from the circuit 46. The circuit 108 may have a size (or capacity) greater than the width of the bus 48.

Reading the areas of the reference pictures from the circuit 46 generally causes delays and inefficient read operations if common access techniques are implemented. The common access techniques are generally slow in comparison to a clock cycle of the circuit 44. Furthermore, for each read access, the circuit 46 generally fetches large amounts of data to the circuit 108 if the data is not already in the circuit 108. The amount of data fetched to the circuit 108 is typically one or even two orders of magnitude larger than the length of the data requested in a specific read operation. However, the rest of the data that was read is typically read later (e.g., for other blocks) so reusing the data held in the circuit 108 may be an advantage if the data is transferred to the circuit 44 before the circuit 108 is flushed.

Figure 3:
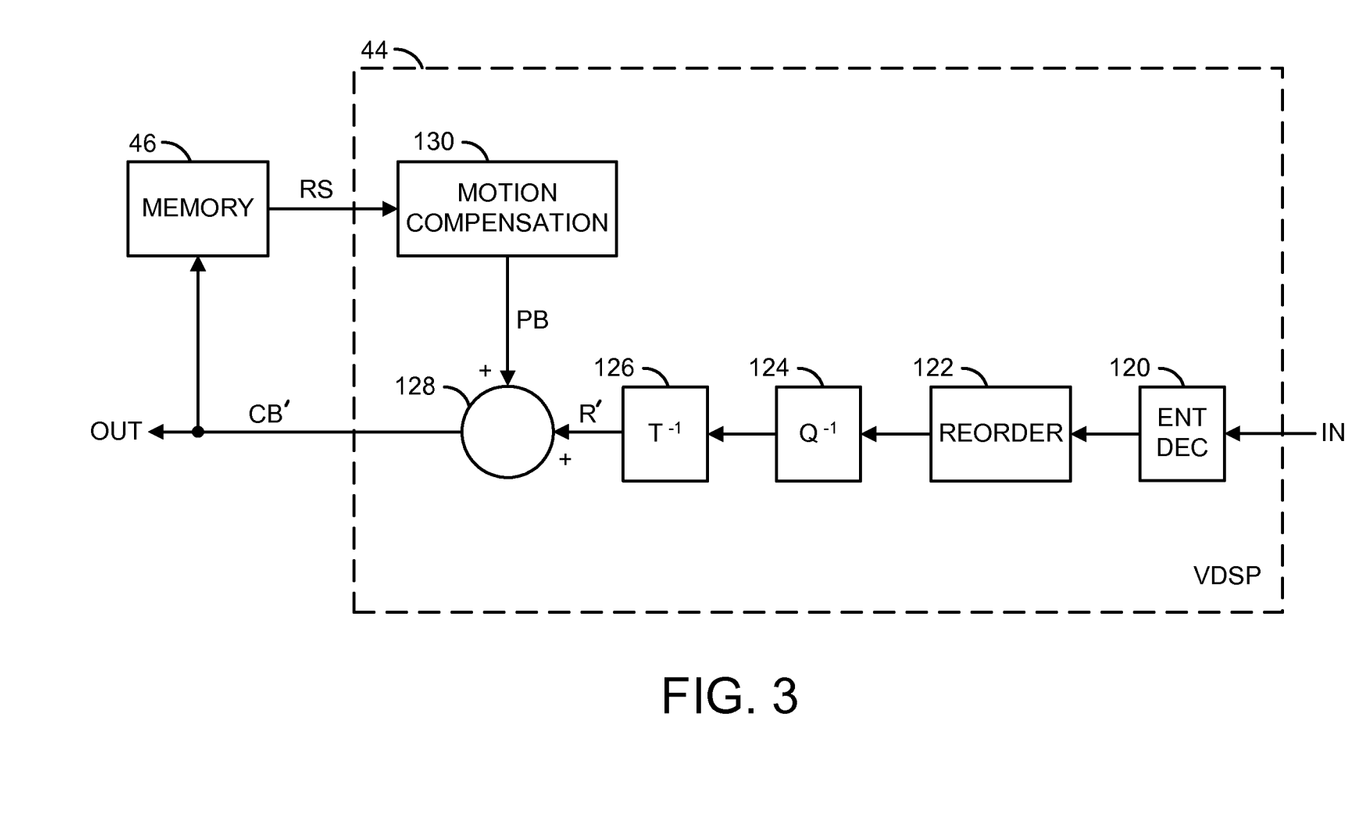
FIG. 3 is a functional block diagram of a portion of a decoding operation in the apparatus.

Referring to FIG. 3, a functional block diagram of a portion of a decoding operation in the circuit 40 is shown. The circuit 40 is generally operational to perform a video decoding process (or method) utilizing motion compensation. The process generally comprises a step (or state) 120, a step (or state) 122, a step (or state) 124, a step (or state) 126, a step (or state) 128 and a step (or state) 130. The steps 120-130 may represent modules and/or blocks that may be implemented as hardware, software, a combination of hardware and software or other implementations.

The step 120 may receive the video bitstream in the signal IN and present data to the step 122. The step 122 may present reordered data to the step 124. The step 124 may present inverse quantized data to the step 1265. The step 126 may generate and present reconstructed residual blocks in a signal (e.g., R') to the step 128. The step 128 may receive the residual blocks in the signal R' and predicted blocks in a signal (e.g., PB) from the step 130. The step 128 may generate and present reconstructed (current) blocks in a signal (e.g., CB') received by the circuit 46. The signal CB' may also be presented by the circuit 44 as the signal OUT. The circuit 46 may present reconstructed samples in a signal (e.g., RS) to the step 130.

The step 120 may implement an entropy decoder step. The step 120 is generally operational to entropy decode symbols and syntax elements within the bitstream received in the signal IN. The decoded information may include, but is not limited to, motion vectors and quantized transform coefficients. The decoded information may be presented to the step 122.

The step 122 may implement a reorder step. The step 122 is generally operational to rearrange an order of the quantized transform coefficients, the motion vectors and other information to reestablish an original order produced in an encoder while the video was being compressed. The reordered information may be presented to the step 124.

The step 124 may implement an inverse quantization step. The step 124 is generally operational to inverse quantize the transform coefficients received from the step 122 to calculate reconstructed transform coefficients. The reconstructed transform coefficients may be transferred to the step 126.

The step 126 may implement an inverse transform step. The step 126 is generally operational to inverse transform the reconstructed transform coefficients to calculate reconstructed residual samples. The reconstructed residual samples may be presented in the signal R'.

The step 128 may implement an adder step. The step 128 may be operational to add the reconstructed residual samples received via the signal R' to motion compensated (predicted block) samples received via the signal PB to generate reconstructed current samples. The reconstructed current samples may be presented in the signal CB' to the circuit 46. In some codecs, the reconstructed current samples may be subjected to a block filtering before presentation in the signal OUT. In other codecs, the reconstructed current samples in the signal CB' may be directly presented in the signal OUT.

The step 130 may implement a motion compensation step. The step 130 is generally operational to calculate a motion compensated (or predicted) block based on the reference samples received from the circuit 46 in the signal RS and one or more motion vectors received from decoding the signal IN. Calculation of the motion compensated block generally involves gathering a block of reference samples around the motion vector where the motion vector has integer-pel (or pixel or sample) dimensions. Where the motion vector has sub-pel dimensions, the motion compensation generally involves calculating interpolated reference samples at sub-pel locations between the integer-pel locations. The sub-pel locations may include, but are not limited to, half-pel locations, quarter-pel locations and eighth-pel locations. The calculated (or predicted) motion compensated block may be presented to the step 128 in the signal PB.

Figure 4:
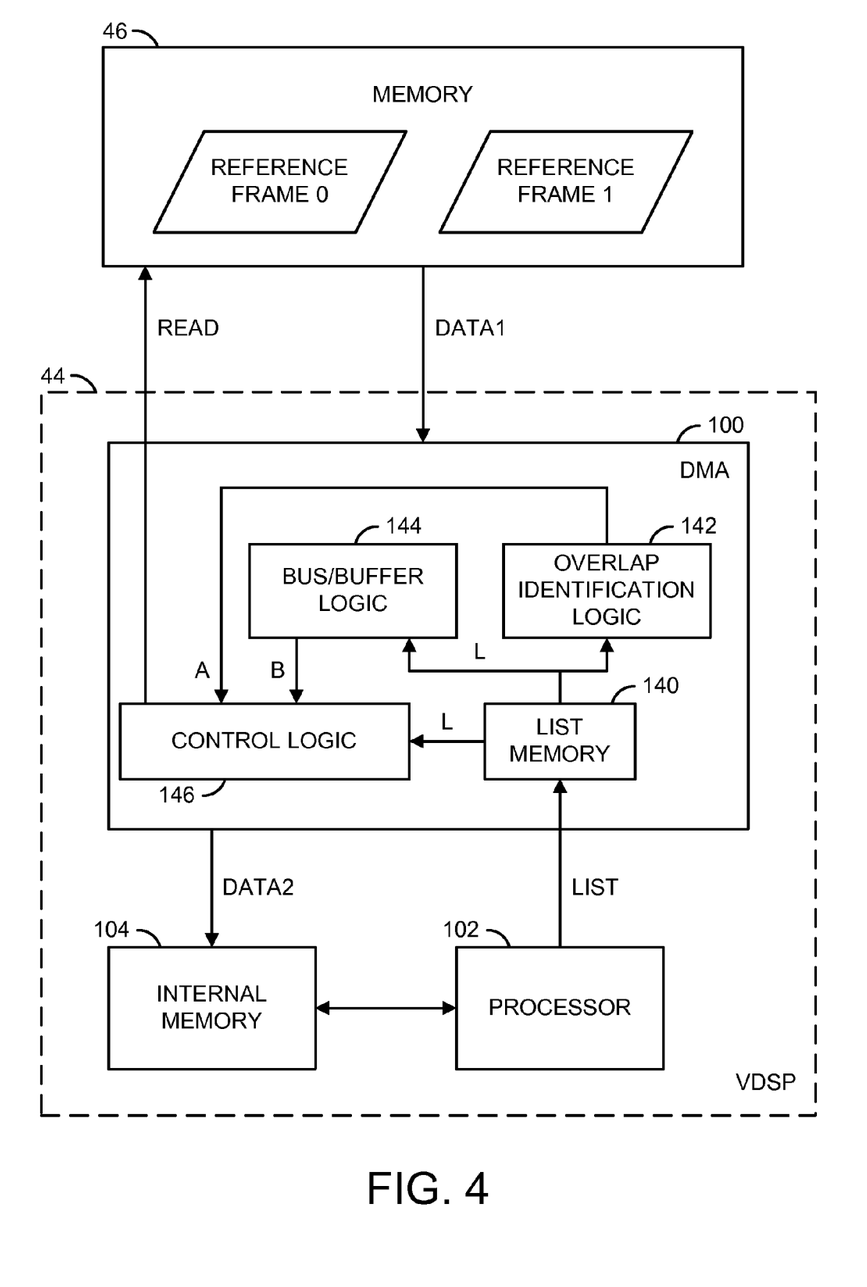
FIG. 4 is a detailed block diagram of an example implementation of a DMA circuit.

Referring to FIG. 4, a detailed block diagram of an example implementation of the circuit 100 is shown. The circuit 100 generally comprises a block (or circuit) 140, a block (or circuit) 142, a block (or circuit) 144 and a block (or circuit) 146. The circuits 140-146 may represent modules and/or blocks that may be implemented as hardware, software, a combination of hardware and software or other implementations.

The circuit 102 (e.g., one or more of the circuits 102a-102n) may generate a signal (e.g., LIST) received by the circuit 140. The circuit 140 may generate and present a signal (e.g., L) received by the circuit 142, the circuit 144 and the circuit 146. A signal (e.g., A) may be generated by the circuit 142 and transferred to the circuit 146. The circuit 144 may generate and present a signal (e.g., B) to the circuit 146. A signal (e.g., READ) may be generated by the circuit 146 and transferred to the circuit 46 via the bus 48. Data read from the circuit 46 may be transferred in a signal (e.g., DATA1) via the bus 48 to the circuit 100. The data received in the signal DATA1 may be presented in another signal (e.g., DATA2) via the bus 106 to the circuit 104.

The circuit 140 may implement a local memory circuit. The circuit 140 is generally operational to store the list of memory read requests (e.g., created from the motion vectors) received from the circuit 102 via the signal LIST. The list may be presented in the signal L from the circuit 140 to each of the circuits 142-146.

The circuit 142 may implement an overlap identification logic circuit. The circuit 142 is generally operational to search the list for at least two of the read requests (e.g., at least two motion vectors) that access a common (or overlapping) area in a reference picture. For each common area found in a reference picture, the circuit 142 may generate overlapping information in the signal A that identifies the overlapping read requests. The circuit 146 may utilize the overlapping information to reduce (or modify) the list such that the common area is only read once from the circuit 46.

The circuit 142 may receive a list of addresses (e.g., start length) and/or other comparable range information (e.g., location of top left corner of the block+block size, etc) from the circuit 140. Logic in the circuit 142 may compare the ranges for an overlap of addresses. In addition, the circuit 142 is generally aware of the memory "penalties", bus sizes and fetch sizes. Therefore, the circuit 142 may check the overlaps of the memory ranges that are fetched on the bus 48

(which is typically wider than the requested range) and so avoid multiple fetches for the overlapping ranges.

The circuit 144 may implement a bus/buffer logic circuit. The circuit 144 is generally operational to analyze the read requests in the list to determine if a utilization of the circuit 108 (FIG. 2) may be increased by rearranging the read requests. The increase may be relative to using the read requests in an order that the motion vectors were received in the bitstream. For example, an order of the read requests may be altered such that none or a few reference samples are (i) copied into the circuit 108 as part of a current DMA read, (ii) not transferred to the circuit 44 in the current DMA read, (iii) flushed from the circuit 108, (iv) copied back into the circuit 108 on a next DMA read and (v) finally transferred to the circuit 44. Instead, the circuit 144 may instruct the circuit 146 via the signal B to move the read requests for the reference samples that would otherwise be part of the next DMA read into the current DMA read.

The circuit 144 may also be operational to instruct the circuit 146 to modify (or rearrange) the list to make full utilization of the bus 48 in each DMA transfer. The width W of the bus 48 generally allows for multiple data samples (e.g., reference samples, current block samples and such) to be transferred in each read cycle and each write cycle between the circuits 44 and 46. However, some DMA transfers may involve a data width that is not an integer multiple of the width W of the bus 48. As such, some bandwidth of the bus 48 may be wasted during such DMA transfers. The circuit 144 may analyze the list to see if any additional reference samples may be fetched to fill the otherwise wasted bandwidth. If additional areas of the reference pictures may be used to improve utilization of the bus 48 bandwidth, the circuit 144 may instruction the circuit 146 to make the appropriate rearrangement in the list.

The circuit 146 may implement a control logic circuit. The circuit 146 is generally operational to fetch the reference samples from the various reference pictures (e.g., reference frame 0, reference frame 1, etc.) buffered in the circuit 46. The number of DMA transfers used to fetch the reference samples and an order in which the reference samples are read may be controlled by the circuit 146. The control is generally based on (i) the list of read requests received from the circuit 140, (ii) the instructions involving overlapping read requests received from the circuit 142, (iii) the instructions involving utilization of the circuit 108 received from the circuit 144 and (iv) the instructions involving utilization of the width W of the bus 48 received from the circuit 144. Once the read requests have been rearranged (or modified) in the list, the circuit 146 may initiate one or more DMA transfers via the signal READ to fetch (or copy) the requested reference samples from the circuit 46 to the circuit 104. For short lists, a single DMA transfer may be performed. For long lists, the read requests may be divided among two or more DMA transfers.

The circuits 144 and 146 may perform one or more of the following actions. If the same range is part of more than a single member on the list, as identified by the circuit 142, and after the data is read from the circuit 46, the data may be written to all the relevant output locations and the list may be modified to reflect that the data was read. In another example, if the actual read from the circuit 46 via the bus 48 (which is wide) includes several items on the DMA list (or part of them), as identified by block 142, after the data is read from memory the data may be written to all the relevant output locations (in this case different values are written to different locations in comparison to the previous example where the same values were written to different locations) and the list may be modified to reflect that the data was read. The circuit 144 may be used to store the memory read on the same "long" read while the circuit 146 is generally responsible to call the memory reads and the internal memory writes.

As the bitstream in the signal IN is received by the circuit 44, the motion vectors may be parsed from the bitstream. The rest of the bitstream may be transferred to and temporarily buffered in the circuit 46, or in another DDR memory. The buffered bitstream information may be read back to the circuit 44 when the circuit 44 is ready to decode the information.

Each motion vector generally points to a corresponding area (or region or portion) of reference samples in a reference picture stored in the circuit 46. The motion vectors may be converted into read requests by the circuit 102. The read requests may be subsequently assembled into a list by the circuit 102. Each read request may identify (i) a particular reference picture in the circuit 46, (ii) a size and shape of an area within the particular reference picture to be copied and (iii) a destination in the circuit 104 to store the copy. The list may be presented in the signal LIST and stored in the circuit 140.

The list may be assembled since the read requests are generally known in advance due to the parsing of the motion vectors from the bitstream. The read requests may be used to make all the read operations from the circuit 46 more efficient. The list is generally examined by the circuit 100 for a few (e.g., two) situations that may be useful. Overlapping read requests for the same reference samples from multiple items in the list may be a useful feature sought in the list. The overlapping read requests generally exist due to overlaps in motion estimations (or prediction) at the encoder side. By recognizing the overlapping cases, the reference samples may be read once from the circuit 46 (a slow operation) and written several times (a fast operation) in the circuit 104. Other useful features sought in the list may be recognizing how to use the entire size of the bus 48 and/or the entire capacity of the circuit 108. By recognizing the bus/buffer case, the reads may be rearranged such that each fetch of reference samples may maximize usage of the circuit 108 and/or the bus 48.

Figure 5:
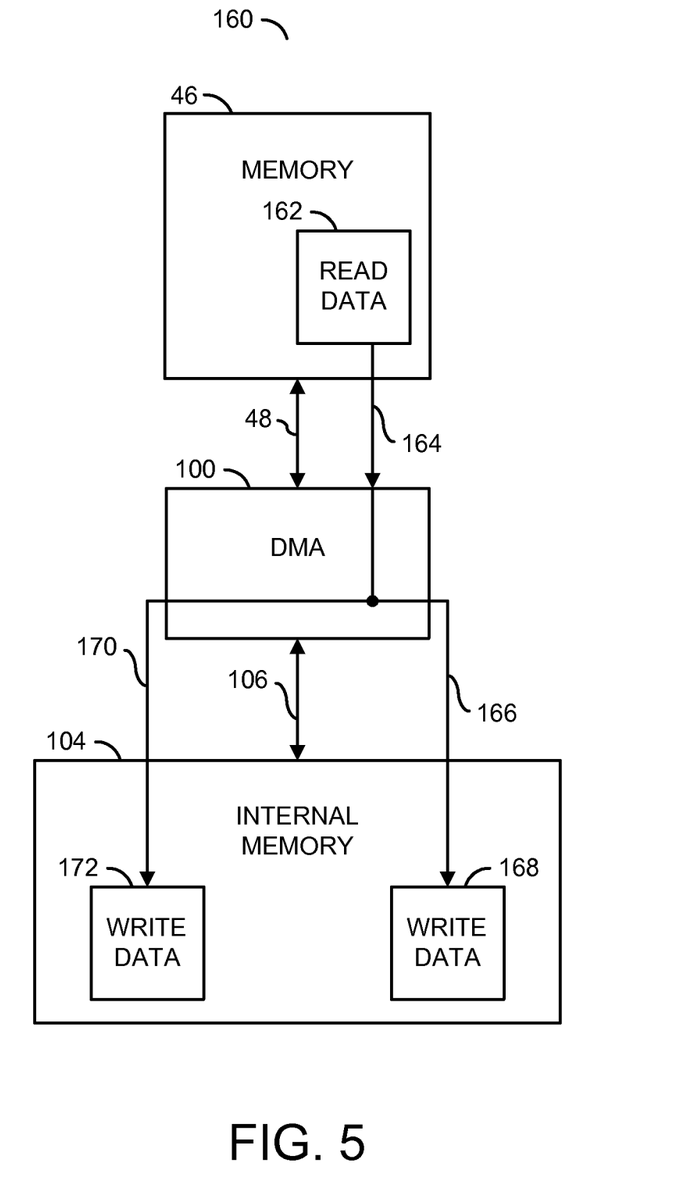
FIG. 5 is a functional flow diagram of an example method for a multi-destination transfer.

Referring to FIG. 5, a functional flow diagram of an example method 160 for a multi-destination transfer is shown. The method (or process) 160 generally comprises a step (or operation) 162, a step (or operation) 164, a step (or operation) 166, a step (or operation) 168, a step (or operation) 170 and a step (or operation) 172. The steps 162 to 172 may represent modules and/or blocks that may be implemented as hardware, firmware, software, a combination of hardware, firmware and/or software, or other implementations. The method 160 may be performed by the circuits 44, 46 and 48.

In the step 162, data (e.g., a region of reference samples in a reference picture) may be stored in the circuit 46. The reference samples (or data) may be transferred (e.g., read) from the circuit 46 to the circuit 100 in the step 164. The transfer may take place on the bus 48. Step 164 may form a part of a single DMA transfer operation. In the step 166, the circuit 100 may transfer (e.g., write) the reference samples to the circuit 104 via the bus 106. The circuit 104 may store the reference samples in the step 168 at a given location. The transfer of step 166 and storage of step 168 may also form parts of the single DMA transfer operation. The reference samples may undergo another transfer (e.g., write) from the circuit 100 to the circuit 104 in the step 170. The transfer of step 170 may also take place on the bus 106.

In the step 172, the reference samples may be stored in the circuit 104 at another location. The transfer of step 170 and the storage of step 172 may form parts of the single DMA transfer. Steps 170 and 172 may be performed in parallel to steps 166 and 168. Although the method 160 illustrates two destinations for the data in the circuit 104, other embodiments may write the data to three or more destinations using the same technique. Additional details of the multi-destination transfer may be found in co-pending U.S. application Ser. No. 12/914,070, filed Oct. 28, 2010, which is hereby incorporated by reference.

Returning to FIG. 2, the overlapping reference samples may be copied into two or more locations within the circuit 104 by the circuit 100. Next, two or more of the circuits 102a-102n may operate on respective copies of the overlapping reference samples in parallel (or simultaneously). The operations may include, but are not limited to, motion compensation operations. Thus, in cases where the signal IN contains multiple motion vectors that access the same reference samples, multiple circuits 102a-102n may motion compensate multiple copies of the same reference samples concurrently. Therefore, the circuit 44 may decode two or more blocks simultaneously based on a single read of the reference samples from the circuit 46.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A video decoding apparatus, comprising:
 a first memory to store first data associated with a reference picture received in a bitstream;
 a second memory to store second data indicative of a plurality of requests to read the first data, each request associated with a motion vector received in the bitstream; and
 a memory access circuit to:
  process the second data by performing at least one of:
   consolidating two or more of the read requests that are associated with a same portion of the first data; or
   ordering the read requests based on a width of a portion of the first data associated with each of the read requests; and
  perform one or more direct memory access (DMA) transfers of one or more portions of the first data stored in the first memory across a data bus coupled to the first memory, the one or more DMA transfers based on the processed second data.

2. The apparatus of claim 1, further comprising:
 a third memory to store the one or more portions of the first data fetched by the one or more direct memory access transfers;
 a core processor circuit to perform motion compensation for a current picture received in the bitstream based on one or more motion vectors and the first data portions stored in the third memory.

3. The apparatus of claim 2, wherein:
the second and third memory are on a same side of the data bus as a core processor circuit; and
the core processor circuit is to assemble the plurality of read requests from a plurality of motion vectors received in the bitstream.

4. The apparatus of claim 1, wherein the memory access circuit is to process the second data by reducing a number of the requests for a first data portion corresponding to a single reference picture block based on a comparison of memory addresses within the first memory that are associated with a first and a second of the read requests.

5. The apparatus of claim 4, wherein, in response to the comparison being indicative of at least two motion vectors relying on a first portion of the first data associated with one region of the reference picture, the memory access circuit is to process the second data to perform one direct memory access transfer of the first portion of the first data.

6. The apparatus of claim 4, wherein the memory access circuit is to perform the one or more direct memory transfer by reading the first portion of the first data once and writing the first portion of the first data to both a first and a second location in the third memory.

7. The apparatus of claim 6,
wherein the first core processor circuit is to perform motion compensation for the current picture based on a first motion vector and the first data portion stored at the first location in the third memory; and
the apparatus further comprises a second core processor circuit to perform motion compensation for the current picture based on a second motion vector and the first data portion stored at the second location in the third memory.

8. The apparatus of claim 1, wherein the memory access circuit is to process the second data by ordering the read requests further based on integer multiples of the bus width.

9. The apparatus of claim 8, wherein the memory access circuit is to:
process the second data by ordering a first read request relative to a second read request to fill at least a portion of the bus width exceeding a width of the first data associated with the first read request with an additional width of the first data associated with the second read request; and
perform a direct memory access transfer of a portion of the first data associated with both the first and second read requests in one read cycle.

10. The apparatus of claim 1, wherein the memory access circuit is further to process the second data to remove one or more read requests in response to the one or more direct memory access transfers.

11. A method for decoding an encoded video bitstream, the method comprising:
storing, in a first memory, first data associated with a reference picture received in the bitstream;
storing, in a second memory, second data associated with a plurality of requests to read the first data, each request associated with a motion vector received in the bitstream;
processing the second data by performing at least one of:
consolidating two or more of the read requests that are for a same portion of the first data; or
ordering read requests based on a width of a portion of the first data associated with each of the read requests; and
performing, based on the processed second data, one or more direct memory access (DMA) transfers of one or more portions of the first data stored in the first memory across a data bus coupled to the first memory.

12. The method of claim 11, further comprising:
storing the one or more portions of the first data fetched by the one or more direct memory access transfers to a third memory;
performing motion compensation for a current picture received in the bitstream based on one or more motion vectors and the first data portions stored in the third memory.

13. The method of claim 11, further comprising performing a comparison of memory addresses within the first memory that are associated with a first and second of the read request; and wherein processing the second data further comprises reducing a number of the requests for a first data portion corresponding to a single picture block based on the comparison.

14. The method of claim 13, wherein one direct memory access transfer of the first portion of the first data is performed in response to the comparison being indicative of at least two motion vectors relying on a first portion of the first data associated with one region of the reference picture.

15. The method of claim 13, wherein performing the one or more direct memory transfer further comprises reading the first portion of the first data once and writing the first portion of the first data to both a first and a second location in the third memory.

16. The method of claim 15, further comprising:
performing motion compensation for the current picture based on a first motion vector and the first data portion stored at the first location in the third memory; and
performing motion compensation for the current picture based on a second motion vector and the first data portion stored at the second location in the third memory.

17. The method of claim 11, the ordering of the read requests is further based on integer multiples of the bus width.

18. The method of claim 17, wherein:
the ordering of the read requests further comprises ordering a first read request relative to a second read request to fill at least a portion of the bus width exceeding a width of the first data associated with the first read request with an additional width of the first data associated with the second read request; and
performing the direct memory access transfer further comprises fetching a portion of the first data associated with both the first and second read requests in one read cycle.

19. A non-transitory computer-readable media, with instruction stored thereon, which when executed by a computer processor, cause the processor to perform a method for decoding an encoded video bitstream, comprising:
storing, in a first memory, first data associated with a reference picture received in a bitstream;
storing, in a second memory, second data associated with a plurality of requests to read the first data, each request associated with a motion vector received in the bitstream;
processing the second data by performing at least one of:
consolidating two or more of the read requests that are for a same portion of the first data; or
ordering read requests based on a width of a portion of the first data associated with each of the requests read; and
performing, based on the processed second data, one or more direct memory access (DMA) transfers of one or more portions of the first data stored in the first memory across a data bus coupled to the first memory.

20. The media of claim 19, further comprising instructions stored thereon, which when executed by the processor further cause the processor to perform the method further comprising:
   storing the one or more portions of the first data fetched by the one or more direct memory access transfers to a third memory;
   performing motion compensation for a current picture received in the bitstream based on one or more motion vectors and the first data portions stored in the third memory.

* * * * *